x 260 x 150

United States Patent Office 3,442,667
Patented May 6, 1969

3,442,667
POLYCRYSTALLINE OXIDE BODIES
Aurel I. Berghezan, Brussels, Belgium, assignor to Union Carbide Corporation, a corporation of New York
Filed Nov. 29, 1963, Ser. No. 327,139
The portion of the term of the patent subsequent to Dec. 27, 1983, has been disclaimed
Int. Cl. C04b 35/10, 35/14
U.S. Cl. 106—39                    2 Claims

ABSTRACT OF THE DISCLOSURE

Two polycrystalline oxide bodies formed from respective ternary melts of $Al_2O_3$—$SiO_2$—$CaO$ and $Al_2O_3$—$SiO_2$—$CuO$, the grains being ternary solid solutions containing at least 90% $Al_2O_3$ and 90% $CuO$, respectively, and at the grain boundaries a thin bonding layer which is the lower melting reaction product of the oxides in the ternary melt.

---

Figure 1:
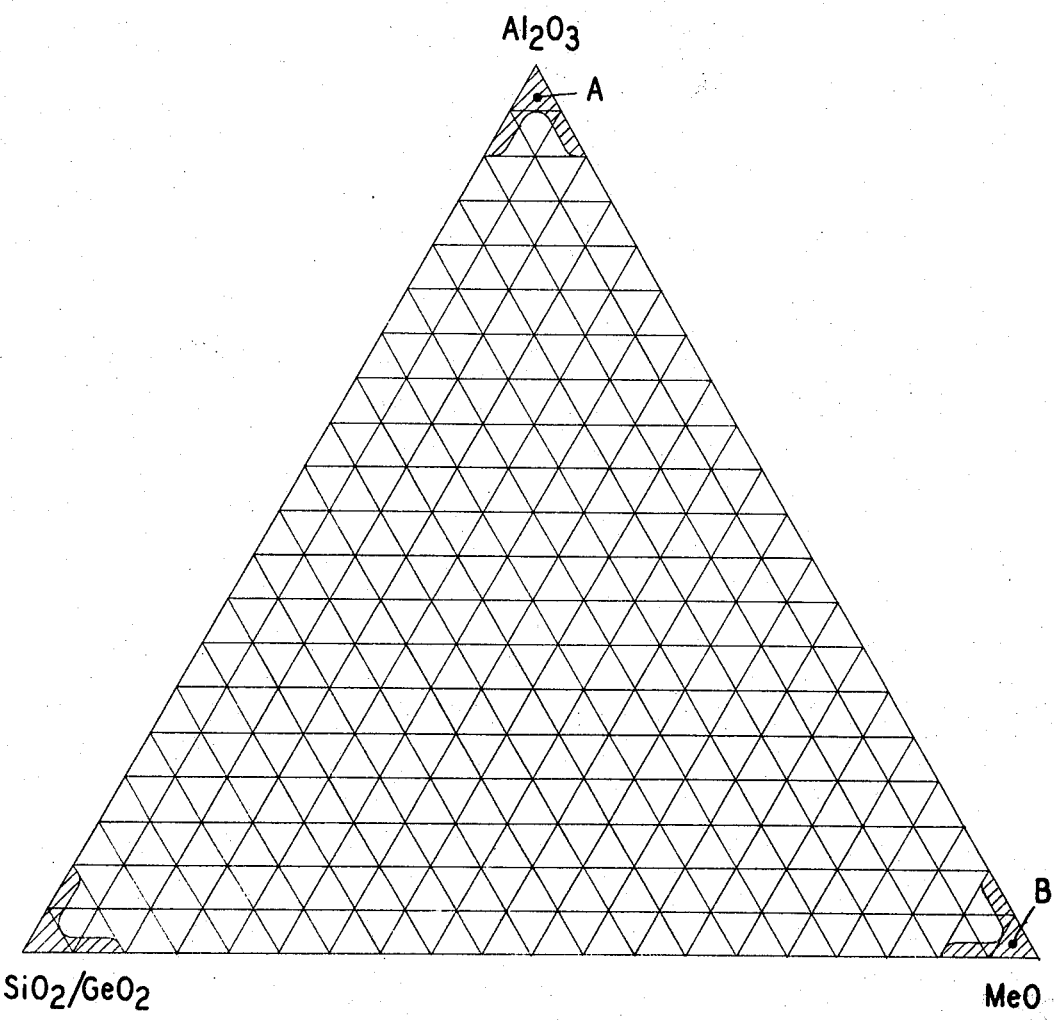

This invention relates to polycrystalline oxide bodies composed of one or more oxides bonded together by a bonding composition.

There is a need today in many applications for materials which are strong at high temperature and also are resistant to oxidation at such high temperatures. Among available materials which would be expected to have the highest performance at high temperatures are the ceramic materials. Generally they are strong, resistant to creep and have excellent resistance to oxidation. However, for many applications they are far too brittle to be useful and generally are quite susceptible to thermal shock failure. Other applications than these high temperature uses exist for which oxide compositions would be attractive but the physical failings of oxide systems also prevent their use here.

The possibility of combining the good high temperature properties of ceramic materials with the properties of metals has been advanced many times and has been rather thoroughly explored in the hope of producing a material superior to either the ceramic or the metal alone. Unfortunately, although numerous combinations of metals and oxides have been tried, the strengths of the resulting materials are low with respect to pure sintered oxide or pure metal. If the ceramic material predominates, the strength approximates but is below that of the pure ceramic, and similarly, if the metal phase predominates, the strength is usually substantially below that of the pure metal.

Reasons for the disappointing characteristics of combinations of metals and ceramics have been sought, and many efforts to solve the problem have been made. It has been recognized for example that bonding between the metal phase and the ceramic phase is weak, but how to overcome this weakness has proved to be an extremely difficult problem.

With respect to the ceramic phase itself, it has been recognized that a material formed by pressing and sintering a finely divided ceramic is not nearly so strong as a single crystal of the same material. Attempts to increase the strength of such compacts by densification methods known to the art are not entirely successful, for such methods lead to grain growth, and the production of large grains tends to increase the anisotropy of the material, particularly with respect to its coefficient of thermal expansion. On the other hand, production of extremely fine-grained material although desirable in some respect, for instance in minimizing anisotropy, does not solve the problem of strength, for it increases the grain boundary areas in the material, and the grain boundaries are inherently weak.

It is believed that weakness at grain boundaries in polycrystalline ceramic materials can be attributed to the nature of the bond between atoms of the materials. This bond must be between neighbor atoms, and the shorter the bond, the stronger. At grain boundaries, partly because of differences in orientation of neighboring grains, the distances between neighbor atoms are increased, and the bond is weakened.

The present invention has for its principal object an effective solution to the problems of weakness in polycrystalline oxide compositions and weakness in the bond between grains of ceramic materials. More specifically, it is an object of the invention to provide polycrystalline oxide bodies having a controlled microstructure providing strong bonds between the grains of the material while suppressing the formation of normal grain boundaries.

Figure 2:
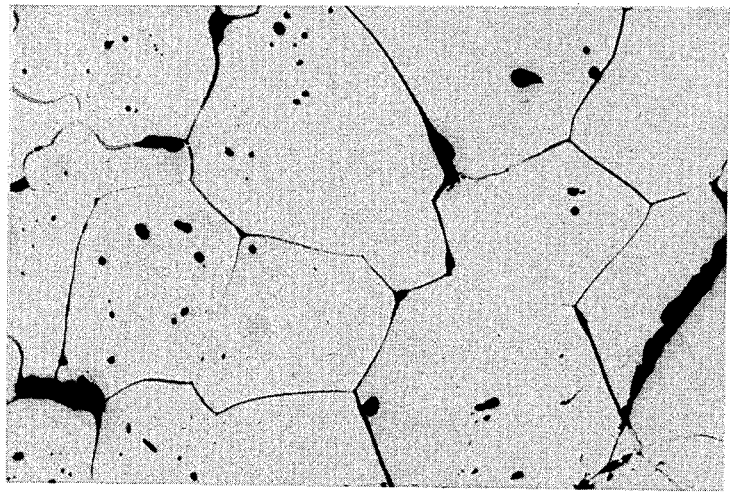
Figure 3:
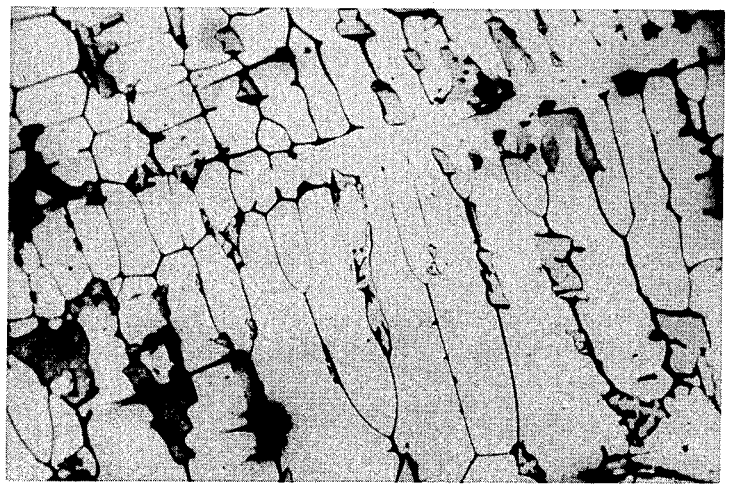

The invention will be described with reference to the accompanying drawing, in which:

FIG. 1 is a ternary diagram illustrating compositions embodying the invention; and FIGURES 2 and 3 are photomicrographs of specific materials embodying the invention.

The invention comprises a body of selected polycrystalline oxides the grains of which are bonded by the reaction product of the oxide and the liquid phase of a composition at least ternary in nature of the selected oxides, the bonding compositions being distributed throughout the body in sites normally corresponding to grain boundaries. The oxide of which the body is formed may be one or more of the following: alumina; silica, which may be replaced in whole or in part by germania; and oxides of copper, cobalt, silver, manganese, nickel, iron, and zinc. Hereinafter, in the drawing, and in the appended claims, the designation "MeO" will be used to refer to this group of metal oxides for the sake of conciseness it being understood that the term is intended to include any oxide of the metals enumerated either alone or in combination. The bonding composition must have a melting point lower than the melting point of the selected oxide system for the body for reasons which will be discussed below.

A fundamental concept of the invention which is believed to be broadly applicable is that the formation of normal grain boundaries in polycrystalline oxide bodies must be suppressed if strength approaching the strength of single crystal oxide is to be attained. In place of these normal grain boundaries, the invention provides a thin layer of bonding composition or cement. This layer of bonding composition must be thin enough to prevent weakness normally encountered at grain boundaries. While it is difficult to give an exact measure for desired thickness of the layer, it should preferably be of submicron size. Examination of the photomicrographs of FIGURES 2 and 3 will show desirably thin layers.

Another fundamental concept of the invention is that the bonding compositions have a melting point below that of the selected oxide system. By providing a liquid phase in contact with the oxide grains, excessive grain growth is prevented during formation of the desired body. Prevention of grain growth minimizes anisotropy and its attendant problems. The liquid phase may react with the oxide system, and diffusion effects may also take place, so that the composition of the thin layer in the final body may be different from that of the liquid phase present during formation of the body.

As may be seen by reference to FIGURE 1 of the drawing, the invention is concerned with materials within small areas at the corners of the ternary diagram there represented. The composition of a polycrystalline oxide body embodying the invention may comprise a substantially pure oxide as indicated or may comprise a ternary material falling within any of the hatched areas. In any event, the liquid phase of the bonding composition falls within any of the hatched areas but must be different from, and have a lower melting point than the selected oxides for the main body.

In terms of numerical limits, the bonding composition should not exceed about 10% by weight of a body embodying the invention and preferably is substantially less than 10%. Generally, one of the components of the bonding composition should be present in an amount less than 2%. The smallest quantity effective to form a thin layer about the grains of oxides is desired.

The following examples illustrate the preparation of bodies embodying the invention.

Example I

Finely divided alumina containing a small but significant proportion of silica was mixed with powdered cobalt oxide ($Co_2O_3$). The mixture was heated to the melting point of $Al_2O_3$ until the formation of a liquid phase was observed. The mixture was then allowed to cool, the liquid phase of course solidifying. A dense, strong, transparent body was obtained.

The microstructure of this body is illustrated by the photomicrograph of FIGURE 2 of the drawing. It will be observed that quite uniformly sized grains of one phase are present, these grains being outlined by a thin network of bonding composition. Tests have indicated the grains to be composed of a high alumina solid solution containing small quantities of cobalt oxide and silica, while the bonding layer is composed substantially of cobalt. The composition of the body is indicated at A in FIGURE 1 of the drawing.

Example II

Powdered copper oxide (CuO) was mixed with powdered silica and alumina in such proportions that silica constituted about 2% of the mixture, and alumina was present in a proportion of about 0.5%. The mixture was heated to about 1200° C. to 1300° C. to melt all the components. Upon cooling, solidification occurred, the binder phase solidifying last. The body thus produced was strong and dense. Its microstructure is typified by the photomicrograph of FIGURE 3 of the drawing. It will be seen that uniformly sized grains are surrounded by thin layers of another material. Examination of the body has shown the grains to be a mixture of copper oxides and the thin lays to be a ternary copper oxide alumina-silica composition. The general composition of the body is indicated at B in FIG. 1 of the drawing. This material has properties recommending its use for rectifiers.

It will be noted from the examples described that polycrystalline oxide bodies having the desired microstructure may be produced in accordance with the invention by preparing a mixture of the desired oxide constituent; providing in the mixture sufficient oxides to produce on heating a ternary (or more complex) liquid phase which wets and bonds to the oxide grains in the mixture; heating the mixture under conditions producing such liquid phase; and cooling the mixture to cause solidification of the liquid material. By employing a minimum of bonding composition, the nearly ideal microstructure shown in the drawing is obtained.

Although the invention is applicable to the preparation of polycrystalline oxide bodies of widely different compositions and properties, a common characteristic is the microstructure which provides more nearly than has heretofore been attained optimum strength characteristics. It will be apparent for example that the high alumina content material illustrated by FIG. 2 has excellent high temperature properties in view of the refractory nature of alumina, but that the material of FIG. 3 is not suited for use at temperatures much above 1000° C. by reason of the low melting points of the phases present. Nevertheless both materials possess requisite strength for use in their respective fields.

It will be evident from the foregoing that the invention is capable of wide application to a great number of materials and that the examples given are illustrative of its principles rather than its scope. Substitution of other oxides for those mentioned may be made. Thus for alumina, other refractory oxides including titania, zirconia, and thoria may be substituted in whole or in part.

What is claimed is:

1. As an article of manufacture a polycrystalline oxide body composed of grains of a high alumina solid solution containing small quantities of silica and cobalt oxide and lying within the hatched area of FIG. 1 of the drawing containing the point A, said grains being bonded together by a thin layer of the reaction product formed in the liquid phase of a ternary composition of alumina, silica and cobalt oxide, said reaction product having a melting point below that of alumina and being substantially all cobalt and being distributed throughout said body in sites normally corresponding to grain boundaries, said cobalt constituting less than 2% by weight of said body.

2. As an article of manufacture a polycrystalline oxide body having a composition within the hatched area of FIG. 1 of the drawing containing the point B and being composed of grains of copper oxide bonded together by a thin layer of the reaction product formed in the liquid phase of a ternary composition of alumina, silica and copper oxide, said reaction product having a melting point below that of the copper oxide grains and being a ternary composition of copper oxide, alumina and silica and being distributed throughout said body in sites normally corresponding to grain boundaries and constituting not more than about 10% by weight of said body.

References Cited

UNITED STATES PATENTS

| | | | |
|---|---|---|---|
| 3,282,711 | 11/1966 | Lin | 106—39 |
| 3,294,496 | 12/1966 | Berghezan | 106—65 |
| 2,544,060 | 3/1951 | Amberg et al. | 106—65 |
| 3,244,539 | 4/1966 | Hare | 106—65 |

OTHER REFERENCES

Searle: Refractory Materials, 1950, 3rd ed., pub. London, Charles Griffin & Co., pp. 184–185.

Gaertner: "A means of Producing Copper—Copper Oxide Rectifiers," Ceramic Bulletin vol. 30 (1951) (pp. 265–266).

Cahoon et al., "Sintering & Grain Growth of Alpha-Alumina," J. Am. Cer. Soc. vol. 39 (1956) (pp. 337–344).

HELEN M. McCARTHY, *Primary Examiner.*

U.S. Cl. X.R.

29—182.5; 106—55, 65